(12) United States Patent
Sato et al.

(10) Patent No.: US 6,888,702 B2
(45) Date of Patent: May 3, 2005

(54) THIN FILM MAGNETIC HEAD DEVICE

(75) Inventors: Isamu Sato, Tokyo (JP); Koji Shimazawa, Tokyo (JP); Satoru Araki, Tokyo (JP)

(73) Assignee: TDK Corporation, Tokyo (JP)

( * ) Notice: Subject to any disclaimer, the term of this patent is extended or adjusted under 35 U.S.C. 154(b) by 329 days.

(21) Appl. No.: 10/025,694

(22) Filed: Dec. 26, 2001

(65) Prior Publication Data

US 2002/0131216 A1 Sep. 19, 2002

(30) Foreign Application Priority Data

Jan. 4, 2001 (JP) ........................................ 2001-000102

(51) Int. Cl.$^7$ ................................................. G11B 5/39
(52) U.S. Cl. .................. 360/319; 360/324.1; 360/324.2
(58) Field of Search ................................ 360/317–318, 360/318.1, 319, 313, 324, 324.1, 324.2; 324/252, 207.21; 338/32 R, 32 H

(56) References Cited

U.S. PATENT DOCUMENTS

| | | | | |
|---|---|---|---|---|
| 5,416,645 A | * | 5/1995 | Fukuyama | 360/46 |
| 5,850,326 A | * | 12/1998 | Takano et al. | 360/122 |
| 5,862,022 A | * | 1/1999 | Noguchi et al. | 360/324.2 |
| 6,066,867 A | * | 5/2000 | Nakamura | 257/295 |
| 6,097,578 A | * | 8/2000 | Pokhil | 360/319 |
| 6,165,287 A | * | 12/2000 | Sato et al. | 148/276 |
| 6,255,813 B1 | * | 7/2001 | Isomura et al. | 324/249 |
| 6,329,078 B1 | * | 12/2001 | Tsuge | 428/678 |
| 6,430,010 B1 | * | 8/2002 | Murdock | 360/319 |
| 6,445,550 B1 | * | 9/2002 | Ishi | 360/317 |
| 6,452,892 B1 | * | 9/2002 | Kumagai et al. | 369/126 |
| 6,535,364 B1 | * | 3/2003 | Kumagai et al. | 360/324.2 |
| 6,542,343 B1 | * | 4/2003 | Gill | 360/324.2 |
| 6,657,824 B1 | * | 12/2003 | Onuma | 360/319 |
| 6,678,127 B2 | * | 1/2004 | Hsiao et al. | 360/323 |

FOREIGN PATENT DOCUMENTS

| | | |
|---|---|---|
| JP | 11-135857 | 5/1999 |
| JP | 2000-113438 | 4/2000 |
| JP | A 2000-200403 | 7/2000 |

\* cited by examiner

Primary Examiner—Brian E. Miller
(74) Attorney, Agent, or Firm—Oliff & Berridge, PLC

(57) ABSTRACT

In a thin film magnetic head device including a reading giant magneto-resistive thin film magnetic head element whose electric equivalent circuit is expressed by a series circuit of an equivalent voltage source and a series resistor $R_H$ and a parallel capacitor C connected in parallel with said series circuit, inductor L is connected in series with said series resistor $R_H$ and a parallel resistor R is connected in series with said parallel capacitor C. The coil L and parallel capacitor C are set such that an angular frequency $\omega_0=1/(LC)^{1/2}$, an angular frequency $\omega_1=1/CR$ and an angular frequency $\omega_H=1/CR_H$ satisfy conditions of $\omega_0>\omega_1$ and $\omega_0>\omega_H$, preferably $\omega_0>>\omega_1$ and $\omega_0>>\omega_H$ to extend a frequency characteristic toward a high frequency range.

10 Claims, 3 Drawing Sheets

THIN FILM MAGNETIC HEAD DEVICE

BACKGROUND OF THE INVENTION

1. Field of the Invention

The present invention relates to a thin film magnetic head device, and more particularly to a thin film magnetic head device comprising a reading thin film magnetic head element whose electric equivalent circuit is represented by a series circuit of an equivalent voltage source and a series resistor having a resistance RH and a parallel capacitor having a capacitance C and connected in parallel with said series circuit.

2. Related Art Statements

A typical thin film magnetic head device having a thin film magnetic head element whose electric equivalent circuit is represented by a series circuit of an equivalent voltage source and a series resistor and a parallel capacitor connected in parallel with said series circuit is a magneto-resistive type thin film magnetic head device.

FIG. 1 is a circuit diagram showing an electric equivalent circuit of a thin film magnetic head element of a known magneto-resistive type thin film magnetic head device. The thin film magnetic head element is represented by a series circuit of an equivalent voltage source 1 and a series resistor 2 having a resistance $R_H$ and a parallel capacitor 3 having a capacitance C and connected in parallel with said series circuit. Both ends of the parallel capacitor 3 are connected to an externally provided reading circuit. In FIG. 1, the externally arranged reading circuit is represented by an input resistor 4 having a resistance $R_{in}$.

The typical magneto-resistive type thin film magnetic head element whose equivalent circuit is expressed by a series circuit of the voltage source 1 and series resistor 2 and the parallel capacitor 3 is a giant magneto-resistive thin film magnetic head element. Upon compared with a normal anisotropic type magneto-resistive thin film magnetic head element, the magneto-resistive thin film magnetic head element has an extremely high resistance change ratio by a magnetic field and can be applied to a high recording density hard disk device. There has been realized a very high surface recording density up to 15 Gb/in$^2$.

The giant magneto-resistive thin film magnetic head element has been realized as anti-ferromagnetic coupling type, induction ferromagnetic type, spin-valve type and glanular type. By using such giant magneto-resistive thin film magnetic head element, it is possible to realize an extremely narrow track width of sub-micron order However, their resistance change ratios do not exceed 10%, and this results in that it is difficult to obtain a sufficiently large reproduced signal if a track is further narrowed. That is to say, the known giant magneto-resistive thin film magnetic head elements could not satisfy severe requirements for extremely high recording density.

There has been proposed a tunneling type giant magneto-resistive element which can produce a large reproduced signal for an extremely narrow track width. Such a tunneling type giant magneto-resistive thin film magnetic head is described in, for instance Japanese Patent Laid-open Publication Kokai Hei 11-135857. FIG. 2 shows a principal structure of such a tunneling type magneto-resistive element. This element includes a first magnetic layer 5 which serves as a free layer whose direction of magnetization is changed in accordance with a magnetic field produced by a magnetic record medium, a second magnetic layer which functions as a pin layer whose direction of magnetization is fixed, an insulating layer 7 arranged between the first and second magnetic layers 5 and 6, and a anti-ferromagnetic layer 8 provided on the second magnetic layer 6. The first and second magnetic layers 5 and 6 have a stacked structure of Co layer and Ni—Fe layer for attaining a large resistance change ratio, and the insulating layer 7 is formed by an $Al_2O_3$ layer manufactured by oxidizing an aluminum layer at the room temperature.

The number of electrons tunneling the insulating layer 7 becomes maximum when the direction of magnetization of the first magnetic layer 5 serving as the free layer is identical with that of the second magnetic layer 6 serving as the pin layer under a condition that a voltage is applied perpendicularly to the insulating layer 7. When the direction of magnetization of the first magnetic layer 5 is opposite to that of the second magnetic layer 6, the number of tunneling electrons becomes minimum. In this manner, a resistance value changes from the maximum value to the minimum value in accordance with the direction of magnetization of the first magnetic layer 5. Theoretically, a resistance change ratio amounts to 50%, and in practice, there has been proposed tunneling type giant magneto-resistive thin film magnetic head element having a resistance change ratio not less than 20%, and such tunneling type elements may be applied to an extremely narrow track width.

An output transfer function Av of a thin film magnetic head element whose electric equivalent circuit is represented by a series circuit of the equivalent voltage source 1 and a series resistor 2 and the parallel capacitor 3 connected in parallel with said series circuit as illustrated in FIG. 1 is given by the following equation (1):

$$A_V = \frac{1}{\sqrt{1 + (\omega/\omega_H)^2}} \quad (1)$$

Here, E is a voltage of the equivalent power source 1. V is an output voltage of the thin film magnetic head element, $\omega_H$ is an angular frequency determined by the capacitance C of the parallel capacitor 3 and the resistance $R_H$ of the series resistor 2 and is expressed by $\omega_H=1/C\,R_H$. It is assumed that the resistance $R_{in}$ of the input resistance 4 is infinite.

As can be understood from the above equation (1), the output transfer function Av of the tunneling type magneto-resistive thin film magnetic head element is decreased in accordance with an increase in the resistance $R_H$ of the series resistor 2. Therefore, the reproduced output signal is decreased in accordance with an increase in the operation frequency, and an operation frequency range is narrowed. In order to increase reproduction speed, it is necessary to extend the operation frequency range up to a high frequency, and it is desired to obtain a large output signal at a high frequency. For instance, in Japanese Patent Laid-open Publication Kokai 2000-113433, there is proposed a thin film magnetic head device having an operation frequency more than 150 MHz.

In order to realize an extremely narrow record track, the thin film magnetic head element has to be miniaturized. The, the resistance $R_H$ of the series resistor 2 is liable to be increased. Particularly, in the tunneling type giant magneto-resistive thin film magnetic head element, the series resistor 2 usually has a high resistance $R_H$ due to the fact that the current flows perpendicularly to the insulating layer 7, and amounts to several hundreds Ω to several KΩ. Therefore, the operation frequency range is limited largely. In order to attain the high speed operation by increasing the operation frequency, the output signal is liable to be lowered, and inherent merits of the tunneling type magneto-resistive thin film magnetic head element might be lost.

SUMMARY OF THE INVENTION

The present invention has for its object to provide a novel and useful thin film magnetic head device including a reading thin film magnetic head element, in which an decrease in a reproduced signal is suppressed up to a high frequency region to extend an operable band width although a series resistance is increased by a miniaturization due to a narrow track width.

According to the invention, a thin film magnetic head device comprises:

a reading thin film magnetic head element whose electric equivalent circuit is expressed by a series circuit of an equivalent voltage source and a series resistor having a resistance $R_H$ and a parallel capacitor having a capacitance C and connected in parallel with said series circuit;

an inductor having an inductance L connected in series with said series resistor; and a parallel resistor having a resistance R and connected in series with said parallel capacitor;

wherein said resistance $R_H$ of the series resistor, capacitance C of the parallel capacitor, inductance L of the inductor and resistance R of the parallel resistor are set to such values that a frequency characteristic of the reading thin film magnetic head element is extended toward a high frequency range.

In a preferable embodiment of the thin film magnetic head device according to the invention, an angular frequency $\omega_0$ determined by the capacitance C of the parallel capacitor and the inductance L of the inductor ($\omega_0=1/(LC)^{1/2}$), an angular frequency $\omega_1$ determined by the capacitance C of the parallel capacitor and the resistance R of the parallel resistor ($\omega_1=1/CR$) and an angular frequency $\omega_H$ determined by the capacitance C of the parallel capacitor and the resistance $R_H$ of the series resistor ($\omega_H=1/CR_H$) satisfy conditions of $\omega_0>\omega_1$ and $\omega_0>\omega_H$. In this case, it is particularly preferable that conditions $\omega_0>>\omega_1$ and $\omega_0>>\omega_H$.

In the thin film magnetic head device according to the invention, the reading thin film magnetic head element may be advantageously formed by a giant magneto-resistive element which has a high resistance change ratio and can be miniaturized for attaining an extremely narrow track width of sub-micron order. Particularly, it is preferable to form the reading thin film magnetic head by a tunneling type giant magneto-resistive element having an extremely high resistance change ratio.

In a preferable embodiment of the thin film magnetic head device according to the invention, a reading thin film magnetic head element formed by a giant magneto-resistive element and a recording thin film magnetic head element formed by an inductive type element are stacked on a substrate. Such a combination type thin film magnetic head device may be advantageously used in a hard disk device having high recording density, large storage capacity and high operation speed. However, according to the invention, the reading thin film magnetic head element is not limited to the giant magneto-resistive element, but may be formed by an anisotropic magneto-resistive element.

DESCRIPTION OF THE PREFERRED EMBODIMENTS

Figure 3:
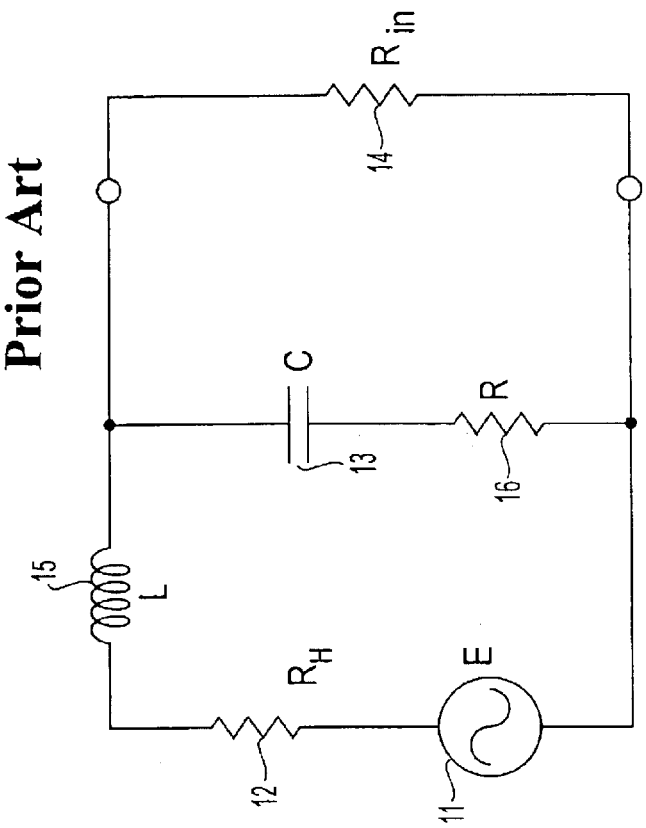
FIG. 3 is an equivalent circuit depicting the thin film magnetic head device according to the invention.
Figure 2:
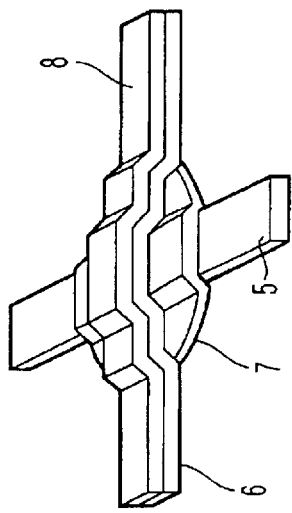
FIG. 2 is a perspective view illustrating a principal structure of the tunneling type magneto-resistive element.

FIG. 3 is an equivalent circuit of the thin film magnetic head device according to the invention. The thin film magnetic head device according to the invention is composed of a series circuit of an equivalent voltage source 11, a series resistor 12 having a resistance $R_H$ and an inductor 15 having an inductance L, a parallel capacitor 13 having a capacitance C and a parallel resistor 16 having a resistance R, both of said parallel capacitor 13 and parallel resistor 16 being connected in parallel with said series circuit. A series circuit of the parallel capacitor 13 and parallel resistor 16 is connected across an input resistor 14 having a resistance $R_{in}$ of an external read-out circuit.

In the thin film magnetic head device according to the invention, since the resistance $R_H$ of the series resistor 12 is several hundreds ohms ($\Omega$) in a case of the tunneling type giant magneto-resistive element which a highest series resistance and the resistance R of the parallel resistor 16 is several kilo ohms (K$\Omega$), ($R_H$+R) may be approximated by R. Then, a transfer function $A_v$ may be expressed by the following equation (2):

$$A_V \equiv \frac{\sqrt{1+(\omega_1/\omega)^2}}{\sqrt{1+(\omega_1/\omega_0)^2(\omega/\omega_0-\omega_0/\omega)^2}} \qquad (2)$$

Wherein, $\omega_0$ is an angular frequency determined by the capacitance C of the parallel capacitor 13 and the inductance L of the inductor 15 ($\omega_0=1/(LC)^{1/2}$), $\omega_1$ is an angular frequency determined by the capacitance C of the parallel capacitor 13 and the resistance R of the parallel resistor ($\omega_1=1/CR$) and an angular frequency $\omega_H$ determined by the capacitance C of the parallel capacitor and the resistance $R_H$ of the series resistor 16 ($\omega_H=1/CR_H$).

Now it is assumed that $\omega_0=2\pi f_0<<\omega_1=2\pi f_1$. Then, the frequency characteristic of the thin film magnetic head device includes a peak at $\omega/\omega_0=1$, and a cut-off frequency at which gains is decreased by 3 dB would be extended toward high frequency side. That is to say, under a condition of $\omega_0<<\omega_1$, a peaking characteristic can be obtained and the frequency characteristic in a high frequency range could be improved.

However, even if the cut-off frequency could be extended toward high frequency side by the peaking characteristic, since the above mentioned condition $\omega_0<<\omega_1$ is satisfied, $\omega_0<<\omega_H$ is obtained. Therefore, the peak frequency $f_0$ would be too low to improve the frequency characteristic. That is to say, when $f_0$ becomes extremely lower than $f_H$, the frequency characteristic could not be effectively extended toward high frequency side.

Next it is assumed that $\omega_0=2\pi f_0 >> \omega_1=2\pi f_1$. Then, a transfer function $A_V$ may be expressed by the following equation (3):

$$A_V \cong \frac{\sqrt{1+(\omega_1/\omega)^2}}{\sqrt{1+(\omega_1/\omega_0)^2(\omega/\omega_0-\omega_0/\omega)^2}} \equiv \tag{3}$$

$$\sqrt{1+(\omega_1/\omega)^2} \cong \sqrt{1+\alpha^2(\omega_1/\omega)^2}$$

Wherein, $\alpha=\omega_1/\omega_0$.

Upon comparing the equation (3) with the equation (2), one can understand that the peaking characteristic due to a denominator of the equation (2) is disappeared in the equation (3). Now it is assumed that $\omega_0/\omega_1<<1$, i.e. $\omega_0<<\omega_1$, the above equation (3) may be rewritten into the following equation (4).

$$A_V \cong 1 + \frac{1}{2}(\omega_0/\omega)^2 \tag{4}$$

As stated above, since $\alpha<<1$, the transfer function $A_V$ becomes nearly 1, i,e, $A_V \cong 1$, it is possible to obtain the improved frequency characteristic having no peaking property.

In the above mentioned explanation, it is assumed that $\omega_0>>\omega_1$, but it can be easily understood that the similar tendency can be attained under a condition $\omega_0>\omega_1$. Therefore, according to the invention, the coil 15 having the inductance L and the parallel resistor 16 having the resistance R are connected in series with the series resistor 12 and the parallel capacitor 13, respectively.

As stated above, according to the invention, the coil 15 and parallel resistor 16 are connected such that the condition $\omega_0>\omega_1$, more particularly $\omega_0>>\omega_1$ is satisfied. Then, the frequency characteristic can be extended toward a higher frequency side without producing a peak. However, if the angular frequency $\omega_0$ determined by the capacitance C of the parallel capacitor 13 and the inductance L of the coil 15 is lower than the angular frequency $\omega_H$ ($=2\pi f_H=1/2\pi CR_H$) determined by resistance R of the series resistor 12 and the capacitance C of the parallel capacitor 13, the frequency characteristic could not be improved. Therefore, according to the invention, the condition $\omega_0>\omega_H$, more particularly $\omega_0>>\omega_H$ is satisfied. In this manner, when both the conditions $\omega_0>\omega_1$, more particularly $\omega_0>>\omega_1$ and the condition $\omega_0>\omega_H$, more particularly $\omega_0>>\omega_H$ are satisfied, it is possible to realize the improved flat frequency characteristic having no peaking property up to a high frequency region.

Figure 1:
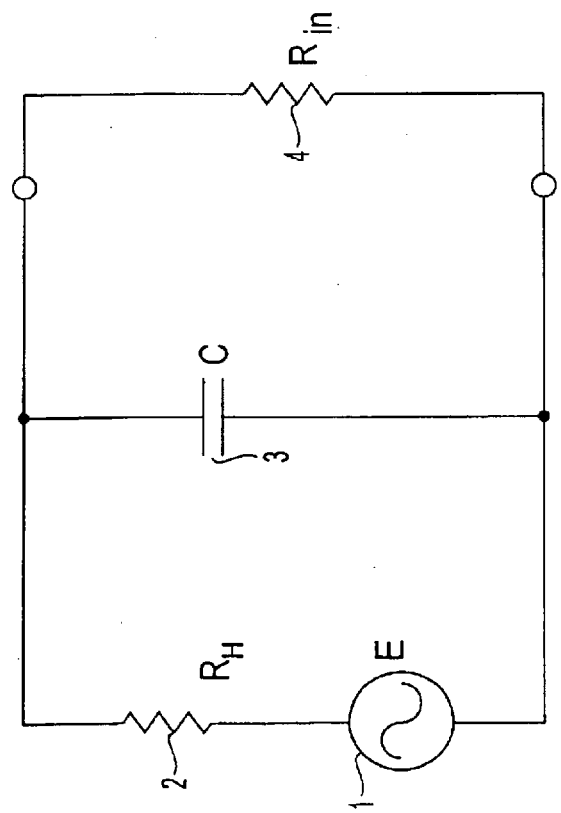
FIG. 1 is an equivalent circuit showing a known thin film magnetic head device including a tunneling type magneto-resistive element.
Figure 4:
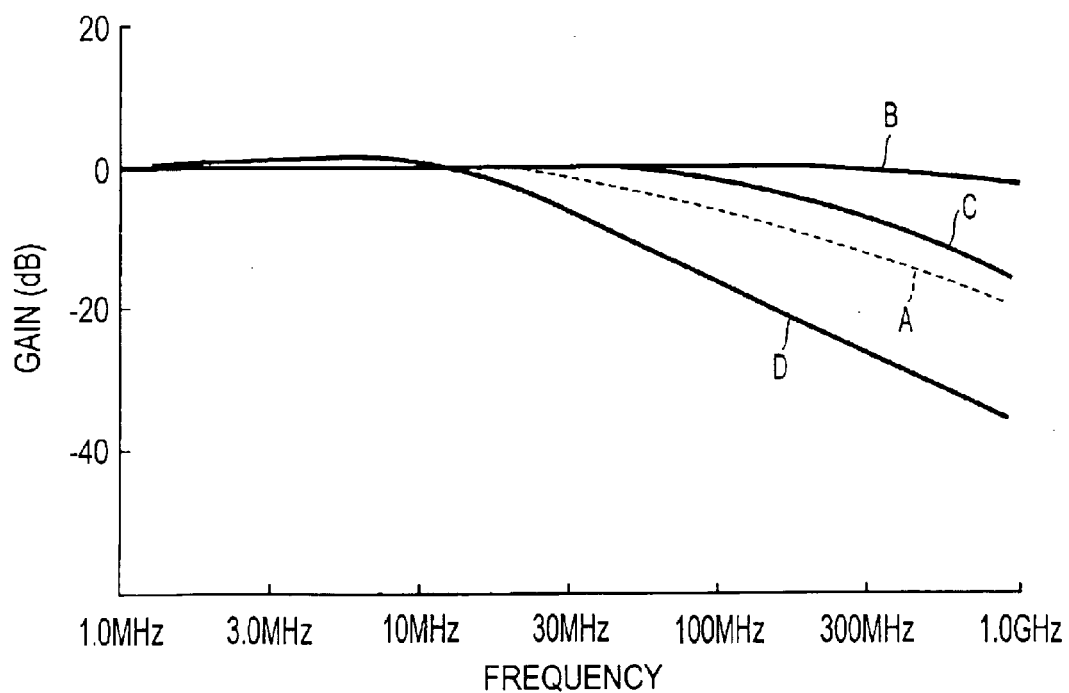
FIG. 4 is a graph representing a frequency characteristic of the thin film magnetic head device according to the invention in comparison with a known thin film magnetic head device.

FIG. 4 is a graph showing simulation results of frequency characteristics of the thin film magnetic head device according to the invention and known thin film magnetic head device illustrated in FIG. 1. In the simulation, the resistance $R_H$ of the series resistor 12 is set to 500Ω, the capacitance C of the parallel capacitor 13 is set to 3 pF, and the resistance R of the parallel resistor 16 is set to 10 kΩ which is far larger than the resistance $R_H$ of the series resistor 12. Then, frequency characteristic of gain is calculated while the inductance L of the coil 15 is changed. Under such a condition, the frequencies $f_1$ and $f_H$ become 5.3 MHz and 106 respectively.

In FIG. 4, a curve A shows a frequency characteristic of the known thin film magnetic head device which does not have the coil 15 and parallel resistor 16 shown in FIG. 3. Curves B, C and D are obtained when the inductance L of the coil L is set to 1 μH, 10 μH and 100 μH, respectively, while the parallel resistor 16 of 10 kΩ is connected in series with the parallel capacitor 13. When L=1 μH, $$f_0 = \frac{1}{2\pi\sqrt{LC}}$$

becomes to 91.9 MHz, and when the inductance L is set to 10 μH and 100 μH, $f_0$ becomes to 29 MHz and 9.2 MHz, respectively. That is to say, the condition of $\omega_0>\omega_1$ according to the invention is satisfied. However, the curve C does not satisfy the condition of $\omega_0>>\omega_H$, and therefore a remarkable improvement could not be obtained as compared with the known thin film magnetic head device denoted by the curve A. Furthermore, the curve D does not satisfy the second condition of $\omega_0>\omega_H$ according to the invention and could not improve the frequency characteristic. According to the invention, by satisfying the first and second conditions simultaneously, it is possible to obtain the highly improved flat frequency characteristic up to a high frequency region as shown by the curve B.

Figure 5:
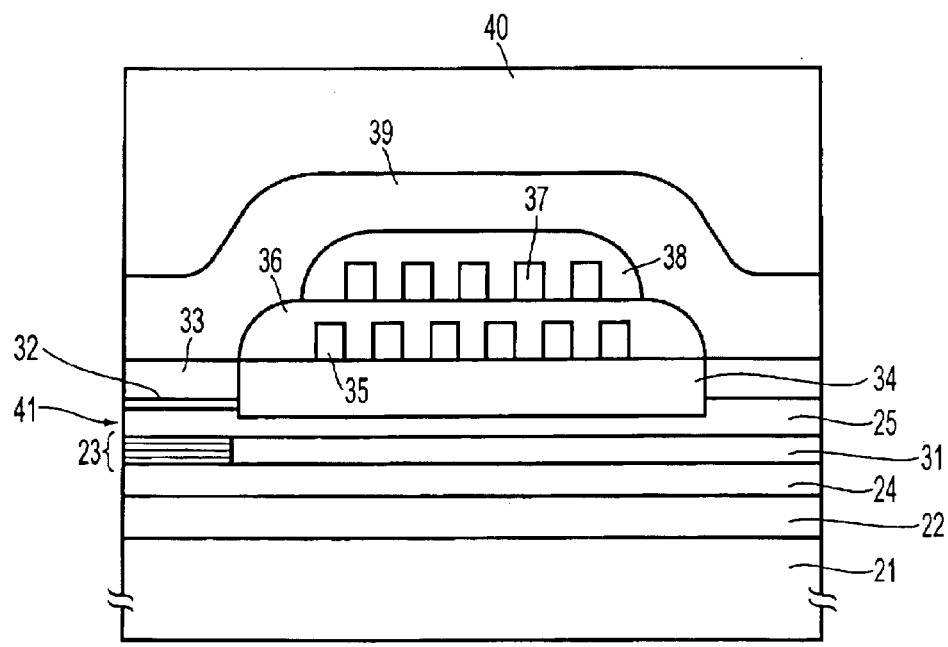
FIG. 5 is a schematic cross sectional view cut along a line perpendicular to an air bearing surface of an embodiment of the thin film magnetic head device according to the invention.
Figure 6:
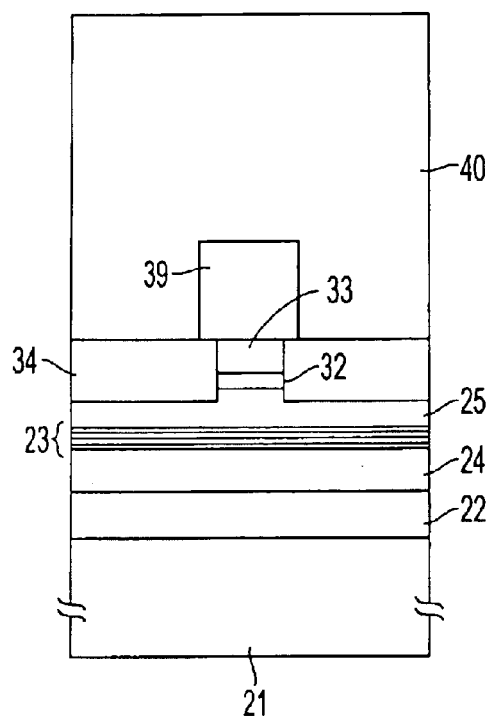
FIG. 6 is a schematic cross sectional view of the thin film magnetic head device shown in FIG. 5 cut along a line parallel with the air bearing surface.
Figure 7:
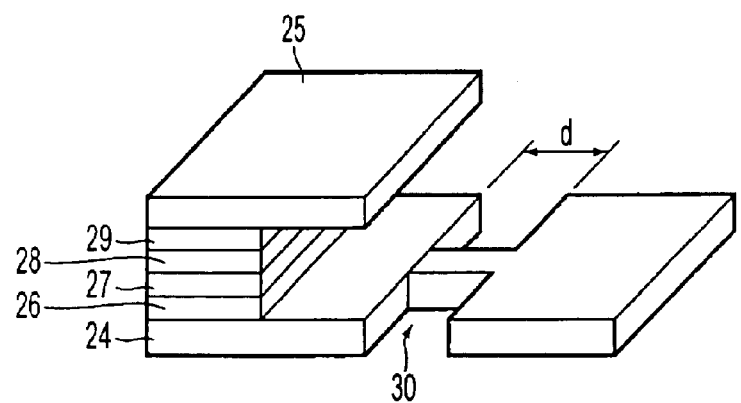
FIG. 7 is a schematic perspective view depicting the construction of a tunneling type magneto-resistive element provided in the thin film magnetic head device shown in FIG. 6.

FIGS. 5–7 illustrate an embodiment of the thin film magnetic head device according to the invention. In the present embodiment, the thin film magnetic head device is constructed as a combination type thin film magnetic head device comprising a reading thin film magnetic head element formed by a giant magneto-resistive element and a recording thin film magnetic head element formed by an inductive type element, said reading element and recording element being stacked on a substrate one upon the other. FIG. 5 is a schematic cross sectional view showing the thin film magnetic head device by cutting along a line perpendicular to an air bearing surface which is to be opposed to a magnetic record medium. FIG. 6 is a schematic cross sectional view cut along a line parallel with the air bearing surface, and FIG. 7 is a schematic perspective view depicting a microstrip line constituting the above mentioned coil 15.

On a surface of a substrate 21 made of AlTiC, an insulating layer 22 made of alumina is deposited, and a tunneling type giant magneto-resistive thin film magnetic head element 23 is formed on the insulating layer 22. In order to protect this magneto-resistive element 23 from an external magnetic field, a lower shield layer 24 made of a permalloy is deposited on the insulating layer 22. The tunneling type giant magneto-resistive element 23 is formed on the lower shield layer 24 on which an upper shield layer 25 is formed.

As shown in FIG. 7, the tunneling type giant magneto-resistive thin film magnetic head element 23 has a stack of free layer 26, insulating layer 27, pinned layer 28 and anti-ferromagnetic layer 29, and a reading current flows through these layers perpendicularly thereto. To this end, in the present embodiment, the lower and upper shield layers 24 and 25 are used as electrodes.

In the present embodiment, the lower shield layer 24 serving as the electrode connected to the free layer 26 has formed therein a microstrip line 30 having a length d to form the coil 15 shown in FIG. 3. According to the high frequency propagation theory, an inductance L of the microstrip line 30 is proportional to its length d. Therefore, the microstrip line can be designed easily with a high freedom. Moreover, since the lower shield layer 24 is formed to be flat, the microstrip line 30 can be manufactured easily and precisely.

Between the lower shield layer 24 and the upper shield layer 25 is filled with an insulating layer 31 made of alumina. These lower and upper shield layers 24 and 25 and insulating layer 31 constitute the capacitor 13 shown in FIG. 3.

Since the upper shield layer 25 serves also as a bottom pole of the inductive type thin film magnetic head element, and is also called bottom pole hereinafter. A write gap layer 32 made of a non-magnetic material such as alumina is formed on the bottom pole 25, and then a pole chip 33 is formed on the write gap layer 32. The pole chip 33 may be formed in the following manner. At first, a magnetic layer made of a magnetic material having a high saturation magnetic flux such as permalloy (Ni: 50%, Fe: 50%) and FeN is deposited on the write gap layer 32, and then the magnetic layer is shaped into a desired pattern by means of a highly precise mask alignment. Since a track width is determined by a width of the pole chip 33, it is important to form the pole chip to have a width as small as possible.

In order to prevent the effective track width from being widened, the write gap layer 32 and the bottom pole 25 are removed by etching while the pole chip 33 is used as a mask to form a so-called trim structure as best shown in FIG. 6. After that, an insulating layer 34 made alumina is formed on a whole surface and its surface is flattened by CMP such that the pole chip 33 and insulating layer 34 have a coplanar surface.

Next, on the flat surface of the insulating layer 34, is formed a first layer thin film coil 35 such that the coil is supported in an electrically isolated manner by means of an insulating layer 36 made of photoresist. After flattening a surface of the insulating layer 36, a second layer thin film coil 37 is formed to be supported in an electrically isolated manner by an insulating layer 38 made of photoresist.

Then, an assembly is annealed at a temperature of, for instance 250° C. to flatten the surface of the insulating layer 38 supporting the second layer thin film coil 37, an upper pole 39 made of permalloy is formed with a thickness of 3 μm on the pole chip 33 and insulating layers 36, 38 in accordance with a given pattern. Then, an overcoat layer 40 made of alumina is formed. Finally, a side wall is polished to form an air bearing surface (ABS) 41 which is opposed to a magnetic record medium. In an actual thin film magnetic head device, there are formed contact pads for electrically connecting the thin film coils 35, 37 as well as the tunneling type giant magneto-resistive thin film magnetic head element 23, these contact pads are not shown in the drawings for the sake of simplicity.

The present invention is not limited to the above explained embodiment, but many alternations and modifications may be conceived by a person skilled in the art within the scope of the invention. For instance, in the above explained embodiment, the thin film magnetic head device is constructed as the combination type thin film magnetic head including the tunneling type giant magneto-resistive thin film magnetic head element and the inductive type thin film magnetic head element are stacked on the substrate, but according to the invention, it is not always necessary to construct such a combination type thin film magnetic head device.

What is claimed is:

1. A thin film magnetic head device comprising:
a reading thin film magnetic head element whose electric equivalent circuit is expressed by a series circuit of an equivalent voltage source and a series resistor having a resistance $R_H$ and a parallel capacitor having a capacitance C and connected in parallel with said series circuit;
an inductor having an inductance L connected in series with said series resistor; and
a parallel resistor having a resistance R and connected in series with said parallel capacitor;
wherein an angular frequency $\omega_1$ determined by the capacitance C of the parallel capacitor and the inductance L of the inductor ($\omega_0=1/(LC)^{1/2}$), an angular frequency $\omega_1$ determined by the capacitance C of the parallel capacitor and the resistance R of the parallel resistor ($\omega_1/CR$) and an angular frequency $\omega_H$ determined by the capacitance C of the parallel capacitor and the resistance $R_H$ of the series resistor ($\omega_H=1/CR_H$) satisfy a condition of $\omega_0>\omega_1$ and $\omega_0>\omega_H$ to obtain a substantially flat frequency characteristic of gain over a frequency range from 1.0 MHz to 1.0 GHz.

2. The thin film magnetic head device according to claim 1, wherein conditions of $\omega_0>>\omega_1$ and $\omega_0>>\omega_H$ are satisfied.

3. The thin film magnetic head device according to claim 2, wherein said reading thin film magnetic head element is formed by a giant magneto-resistive element.

4. The thin film magnetic head device according to claim 3, wherein said reading thin film magnetic head element is formed by a tunneling type giant magneto-resistive element having a free layer, an insulating layer, a pin layer, an anti-ferromagnetic layer stacked in this order, and said thin film magnetic head device further comprises first and second electrode layer connected to said free layer and pinned layer, respectively.

5. The thin film magnetic head device according to claim 4, wherein said inductor is formed by a microstrip line which is formed in one of said first and second electrode layers, and said parallel capacitor is formed by said first and second electrode layers and an insulating layer provided between the first and second electrode layers.

6. The thin film magnetic head device according to claim 5, wherein said first and second electrode layers are made of an electrically conductive magnetic material such that said first and second electrode layers serves as magnetic shield layers.

7. The thin film magnetic head device according to claim 3, wherein said thin film magnetic head device is formed as a combination type thin film magnetic head device including a reading giant magneto-resistive element and a recording inductive type thin film magnetic head element, said reading giant magneto-resistive element and recording inductive type thin film magnetic head element being stacked one on the other on a substrate.

8. The thin film magnetic head device according to claim 7, wherein said reading thin film magnetic head element is formed by a tunneling type giant magneto-resistive element having a free layer, an insulating layer, a pinned layer, an anti-ferromagnetic layer stacked in this order, and said thin film magnetic head device further comprises first and second electrode layer connected to said free layer and pinned layer, respectively.

9. The thin film magnetic head device according to claim 8, wherein said inductor is formed by a microstrip line which is formed in one of said first and second electrode layers, and said parallel capacitor is formed by said first and second electrode layers and an insulating layer provided between the first and second electrode layers.

10. The thin film magnetic head device according to claim 9, wherein said first and second electrode layers are made of an electrically conductive magnetic material such that said first and second electrode layers serves as magnetic shield layers.

* * * * *